(12) United States Patent
Ishii

(10) Patent No.: US 6,424,127 B1
(45) Date of Patent: Jul. 23, 2002

(54) ALTERNATOR CONTROLLER

(75) Inventor: Akihiro Ishii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 36 days.

(21) Appl. No.: 09/732,707

(22) Filed: Dec. 11, 2000

(30) Foreign Application Priority Data

Jun. 2, 2000 (JP) ........................................ 2000-166168

(51) Int. Cl.[7] ................................................ H02P 9/08
(52) U.S. Cl. ............................................ 322/36; 322/28
(58) Field of Search ............................. 322/18, 19, 22, 322/25, 27, 28, 37, 29, 36

(56) References Cited

U.S. PATENT DOCUMENTS

| | | | | |
|---|---|---|---|---|
| 5,157,321 A | * | 10/1992 | Kato et al. | ................... 320/148 |
| 5,262,711 A | * | 11/1993 | Mori et al. | ................... 320/123 |
| 5,280,232 A | * | 1/1994 | Kohl et al. | ................... 320/137 |
| 5,319,299 A | * | 6/1994 | Maehara | ........................ 322/28 |
| 5,512,813 A | * | 4/1996 | Uchinami | ................... 320/163 |
| 5,561,363 A | * | 10/1996 | Mashino et al. | ............... 322/25 |
| 5,581,172 A | * | 12/1996 | Iwatani et al. | ................. 322/24 |
| 5,629,606 A | * | 5/1997 | Asada | ......................... 320/145 |
| 5,801,516 A | * | 9/1998 | Rice et al. | ..................... 322/18 |

FOREIGN PATENT DOCUMENTS

JP    3-143300    6/1991

* cited by examiner

*Primary Examiner*—Nicholas Ponomarenko
(74) *Attorney, Agent, or Firm*—Sughrue Mion, PLLC

(57) ABSTRACT

Power generation by an alternator is controlled by switching a target charging voltage by a signal from an engine control unit so that engine-starting characteristics when the engine starts are prevented from deterioration due to the load of the alternator. The circuit initiates the generation by the alternator according to a gradual excitation control signal when the engine starts and makes the alternator generate according to a prohibit-power-generation signal after the completion of the starting.

4 Claims, 4 Drawing Sheets

ALTERNATOR CONTROLLER

BACKGROUND OF THE INVENTION

1. Field of the Invention

The present invention relates to a controller of an alternator used for vehicle engines, etc.

2. Description of the Related Art

FIG. 4 is a schematic circuit diagram showing a conventional alternator controller.

In FIG. 4, numeral 101 denotes a stator winding; numeral 2 denotes a full-wave rectifier; numerals 201 to 206 denote rectifying diodes; numeral 5 denotes a generating prohibiting circuit; numeral 6 denotes a target charging voltage switching circuit; and numeral 7a denotes an alternator control circuit.

According to a signal of an engine condition signal 10a from an engine control unit 10, a target charging voltage of a battery 3 is switched to any one of a high target charging voltage (VrefH) 603 and a low target charging voltage (VrefL) 605 by a switching element 601. When a voltage of the battery 3 is lower than the target voltage, a comparator 501 outputs "H" so as to turn on a transistor 701, which is a switch element, so that a current passes through a field winding 102 which is a rotor winding, thereby generating power in an alternator 1.

In the conventional alternator as above, since a starter motor is used when an engine is started so that a battery voltage is lowered, power generation is started by the alternator just after the engine starting even when any one of the target charging voltages is set, thereby there has been a problem that engine-starting-characteristics deteriorate due to the load of the alternator.

SUMMARY OF THE INVENTION

In order to solve the above-mentioned problem, it is an object of the present invention to provide an alternator controller capable of preventing engine-starting characteristics from deterioration due to the load of the alternator in the alternator controller which controls power generation by switching a reference charging voltage for a battery according to a signal from an engine control unit.

In view of the above-mentioned object, an alternator controller according to the present invention comprises: a starting-completion detecting circuit for generating a signal indicating completion of engine starting from a voltage generated by an alternator; a target charging voltage switching circuit for switching a target charging voltage for a battery according to an engine condition signal from an engine control unit; a generation prohibiting circuit for generating a prohibit-power-generation signal when the voltage of the battery is larger than the target charging voltage; a gradual excitation control circuit for generating a gradual excitation control signal according to the engine condition signal from the engine control unit, wherein when an engine starting condition is right at the engine starts, the gradual excitation control circuit gradually initiates generation by the alternator just after the engine starts and when the engine starting condition is wrong, the circuit delays generation by the alternator after the engine starts and then initiates the alternator to generate gradually; and an alternator control circuit for generating an alternator control signal from the starting-completion signal, the prohibit-power-generation signal, and the gradual excitation control signal, wherein the alternator control signal initiates the generation by the alternator according to the gradual excitation control signal when the engine starts and makes the alternator generate according to the prohibit-power-generation signal after the completion of the starting.

The starting-completion detecting circuit may comprise a comparator for detecting the completion of engine starting by comparing the voltage generated by the alternator with a predetermined reference voltage.

Also, the gradual excitation control circuit may comprise a comparator for generating the gradual excitation control signal in which the duty ratio increases gradually based on a comparison between a sawtooth wave and a linear wave increasing with time from the minimum voltage of the sawtooth wave when the engine starting condition is right, and between a sawtooth wave and a linear wave increasing with time from a voltage lower than the minimum voltage of the sawtooth wave when engine starting condition is wrong.

Preferably, the alternator control circuit comprises a switching element connected in series to a field winding of the alternator and a logic circuit for generating a signal by using the starting-completion signal, the prohibit-power-generation signal, and the gradual excitation control signal as inputs, the signal controlling the switching element so as to initiate generation by the alternator according to the predetermined gradual excitation control signal when the engine starts and to make the alternator generate according to the prohibit-power-generation signal after the completion of the starting.

BRIEF DESCRIPTION OF THE DRAWINGS

FIG. 2A is a graph showing input signals to a comparator in a gradual excitation control circuit at the start of an engine when cooling water is at low temperature while

FIG. 3A is a graph showing input signals to a comparator in a gradual excitation control circuit at the start of an engine when cooling water is not at the low temperature while

DESCRIPTION OF THE PREFERRED EMBODIMENTS

Figure 1:
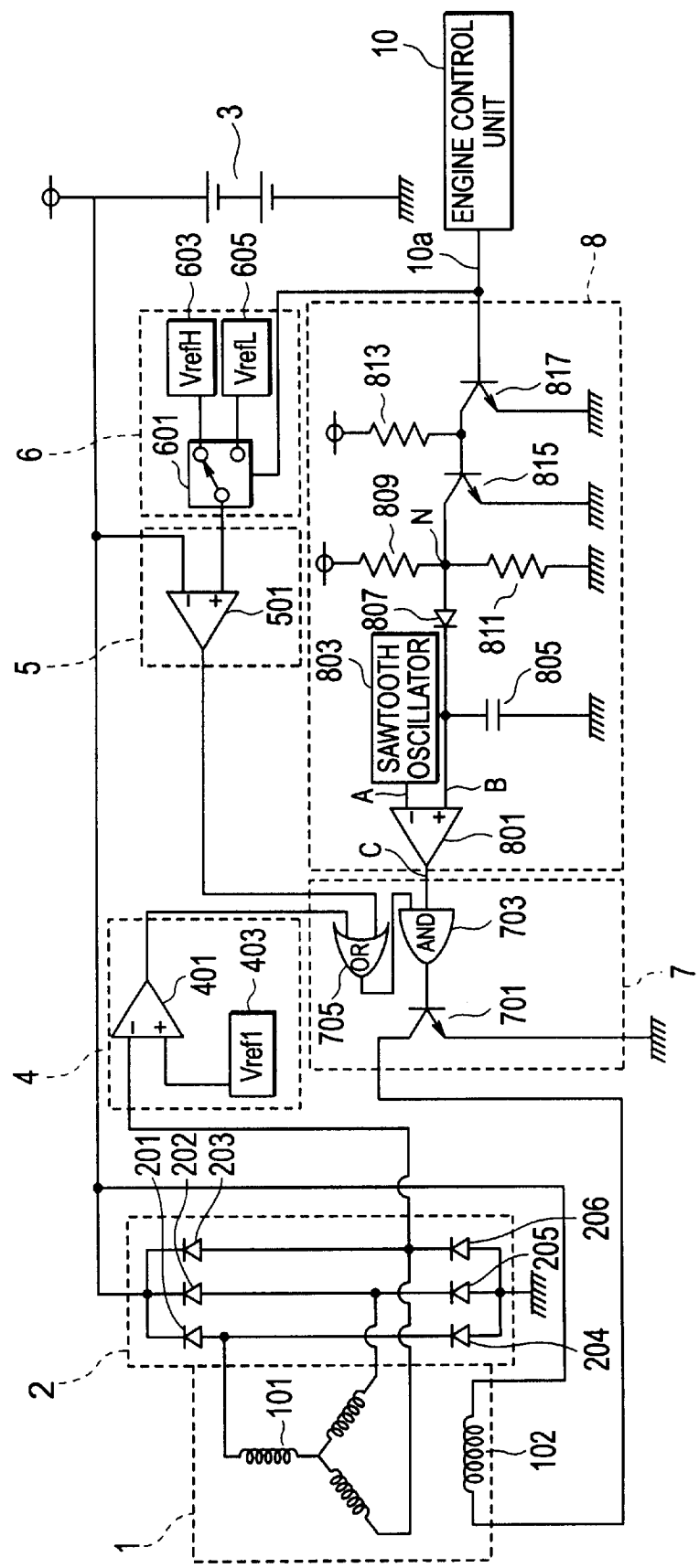
FIG. 1 is a schematic circuit diagram of an alternator controller according to an embodiment of the present invention.
Figure 4:
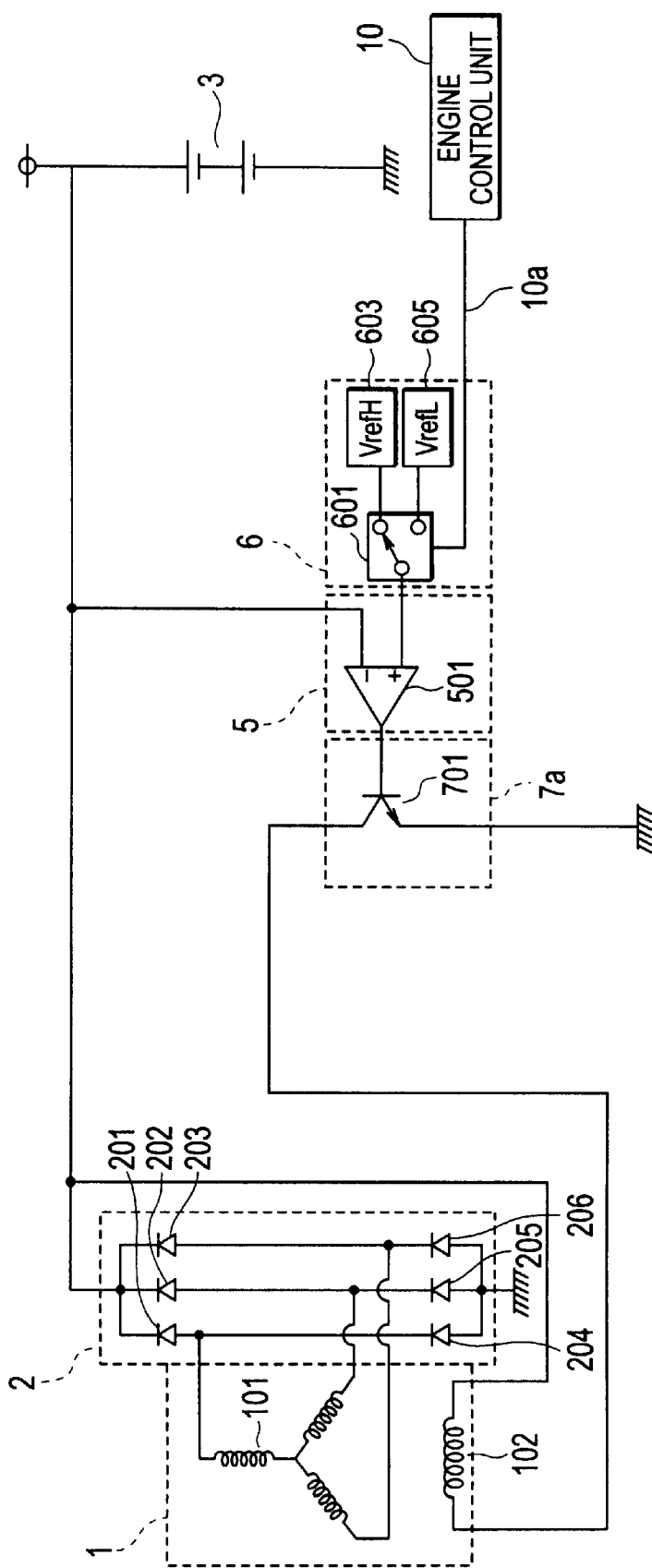
FIG. 4 is a schematic circuit diagram showing a conventional alternator controller.

FIG. 1 shows a schematic circuit diagram of an alternator controller according to an embodiment of the present invention. In FIG. 1, like reference characters designate like functional portions common to a conventional circuit in FIG. 4. In FIG. 1, a starting-completion detecting circuit 4 generates a signal indicating the completion of engine starting from a voltage generated by an alternator and comprises a comparator 401 comparing the voltage generated by the alternator with a predetermined reference voltage (Vref1) 403 so as to detect the engine-starting completion.

A gradual excitation control circuit 8 generates a gradual excitation control signal according to a signal of engine conditions 10a from the engine control unit 10, wherein when the engine starting condition is right, the circuit 8 gradually initiates generating of the alternator just after the engine starts and when the engine starting condition is wrong, the circuit 8 gradually initiates generating of the alternator after delaying the alternator to generate when the engine starts. The gradual excitation control circuit 8 comprises a sawtooth oscillator 803; a capacitor 805; a diode 807; resistors 809, 811, and 813; and transistors 815 and 817. When the engine starting condition is right, the circuit 8 generates a linear wave increasing with time from the minimum voltage of a sawtooth wave and when the engine starting condition is wrong, the circuit 8 generates a linear wave increasing with time from a lower voltage than the minimum voltage of the sawtooth wave. A comparator 801 generates a gradual excitation control signal based on a comparison of the sawtooth wave and the linear wave, in which the duty factor is gradually increased.

An alternator control circuit 7 generates an alternator control signal from a starting-completion signal of the starting-completion detecting circuit 4, a prohibit-power-generation signal of a generation prohibiting circuit 5, and a gradual excitation control signal of the gradual excitation control circuit 8, wherein the alternator control signal initiates the generation of the alternator according to the gradual excitation control signal when the engine starts and makes the alternator generate according to the prohibit-power-generation signal after the completion of the starting. A transistor 701 is a switching element connected to the field winding 102 of the alternator. An OR circuit 705 and an AND circuit 703 form a logic circuit for generating a signal for controlling the transistor 701 by using the starting-completion signal, the prohibit-power-generation signal, and the gradual excitation control signal as inputs, so as to initiate the generation of the alternator according to the gradual excitation control signal determined by the signal of engine conditions when the engine starts and to make the alternator generate according to the prohibit-power-generation signal after the completion of the starting.

Figure 2A:
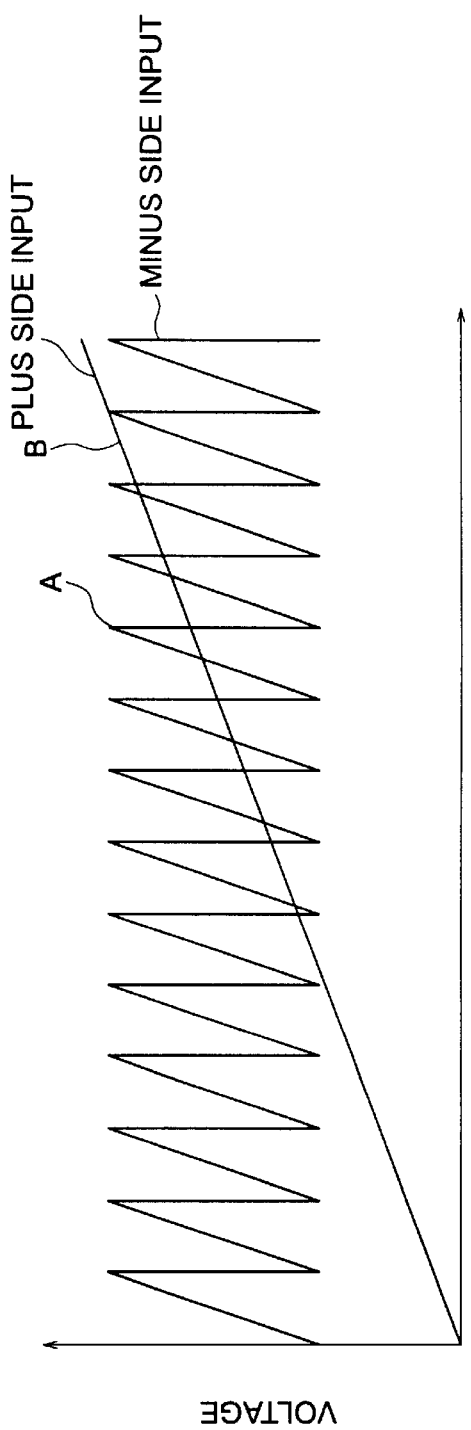
Figure 2B:
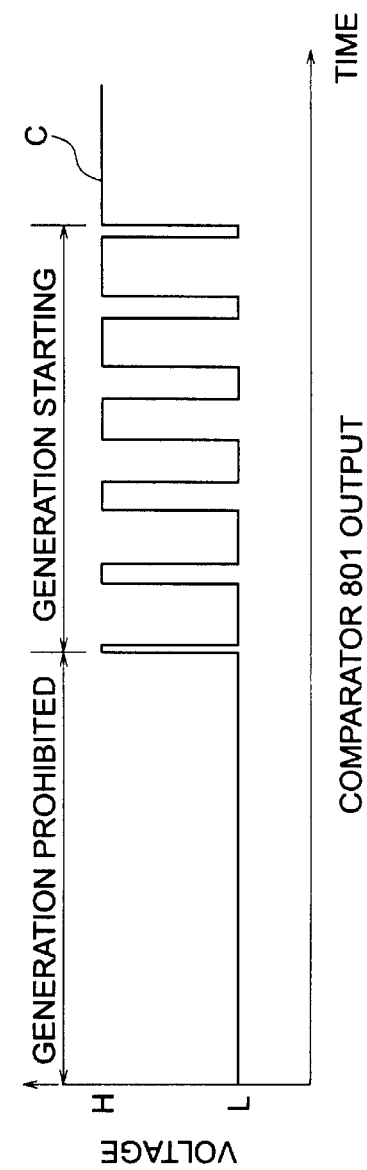
FIG. 2B is a graph showing output signals therefrom.
Figure 3A:
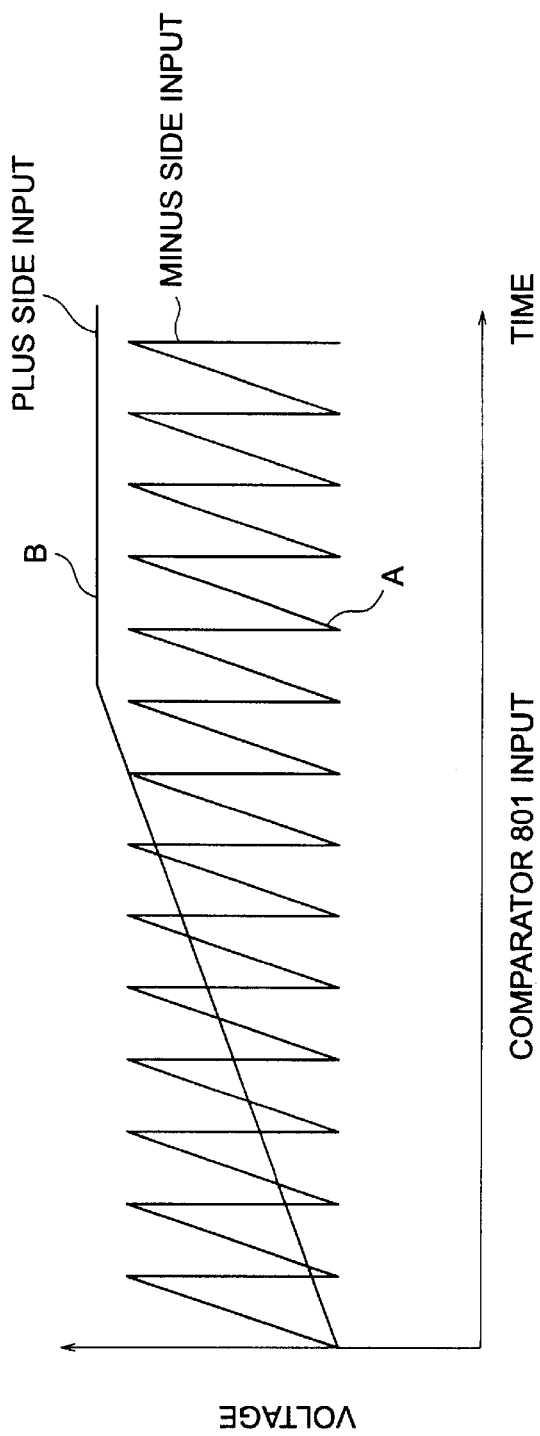
Figure 3B:
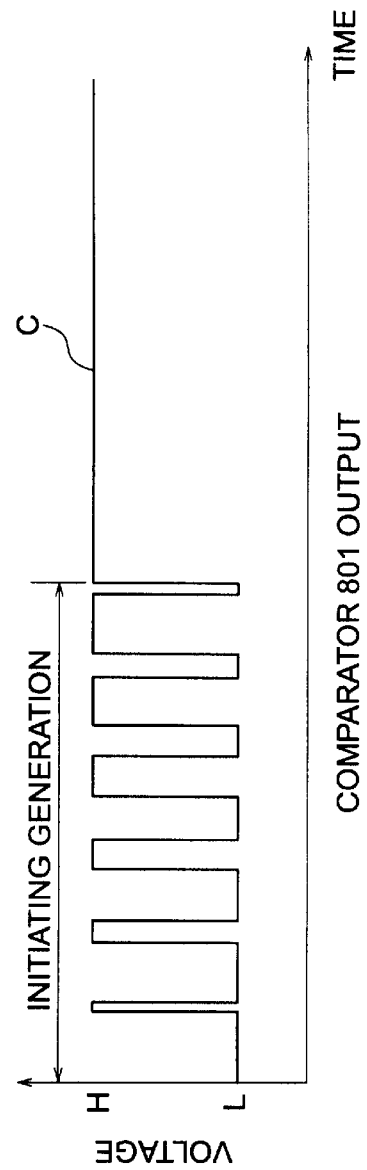
FIG. 3B is a graph showing output signals therefrom.

FIG. 2A shows input signals to a comparator 801 when the signal of engine conditions 10a from the engine control unit 10 is low ("L") while FIG. 2B shows output signals therefrom. FIGS. 3A and 3B are similar graphs when the signal of engine conditions 10a is high ("H"). The sawtooth oscillator 803 generates a sawtooth wave "A"; the circuit including the capacitor 805 outputs a linear wave "B"; and the comparator 801 outputs a gradual excitation control signal "C".

Next, operations will be described. It is determined whether the condition is an engine-starting state by the starting-completion signal of the starting-completion detecting circuit 4. The engine is in the starting condition until a voltage generated by the alternator 1 exceeds a predetermined reference voltage (Vref1) and the starting-completion signal from the comparator 401 is "H". During the "H" of the starting-completion signal, the transistor 701 is controlled according to the gradual excitation control signal from the gradual excitation control circuit 8 in the alternator control circuit 7.

In the gradual excitation control circuit 8, when the signal of engine conditions 10a from the engine control unit 10 is "L", that is when cooling water is at low temperature when the engine starts, for example, the transistor 817 is turned off while the transistor 815 is turned on, so that the linear wave to be input to the plus side input of the comparator 801 is increasing from the ground level as shown by "B" in FIG. 2A, because a connecting point "N" between the potential dividing resistors 809 and 811 is in the ground level (it is not limited to the ground level so long as it is less than the minimum voltage of the sawtooth wave). By inputting the sawtooth wave to the minus side input of the comparator 801 as shown by "A" in FIG. 2A, the output of the comparator 801, that is the gradual excitation control signal, is to be as shown by "C" in FIG. 2B. When the output of the comparator 801 is "H", the transistor 701 of the alternator control circuit 7 is turned on so that the current passes through the field winding 102 of the alternator 1 to thereby generate power. Therefore, after the engine starts, the power generation of the alternator 1 is prohibited (delayed) for a predetermined period then the gradual excitation control is performed, that is a field current through the field winding 102 is gradually increased so as to initiate the power generation.

When the signal of engine conditions 10a from the engine control unit 10 is "H", that is when cooling water is not at low temperature when the engine starts, the transistor 817 is turned on while the transistor 815 is turned off, so that the linear wave to be input to the plus side input of the comparator 801 is increasing from the minimum voltage, or from the voltage level close to it, of the sawtooth wave determined by the potential dividing ratio of the potential dividing resistors 809 and 811 as shown by "B" in FIG. 3A, for example, because the connecting point "N" between the potential dividing resistors 809 and 811 is to be the voltage determined by the potential dividing ratio. By inputting the sawtooth wave to the minus side input of the comparator 801 as shown by "A" in FIG. 3A, the output of the comparator 801, that is the gradual excitation control signal, is to be as shown by "C" in FIG. 3B. Therefore, the gradual excitation control is performed just after the engine starts, in which a field current through the field winding 102 is gradually increased.

When the engine is started to initiate power generation, a voltage is generated across a stator winding 101 of the alternator 1, which is in turn increased to be the predetermined reference voltage (Vref1) 403, thereby the starting-completion signal. of the comparator 401 in the starting-completion detecting circuit 4 is to be "L". Since the gradual excitation control signal of the comparator 801 in the gradual excitation control circuit 8 is normally "H" after the engine starts, the transistor 701 is controlled from the prohibit-power-generation signal of the generation prohibiting circuit 5 by the logic circuit comprising the OR circuit 705 and the AND circuit 703 in the alternator control circuit 7, so that after the engine starts, the controlling by switching the target charging voltage is performed identically with the conventional one by a target charging voltage switching circuit 6 and the generation prohibiting circuit 5 based on the signal of engine conditions 10a from the engine control unit 10.

In accordance with the present invention described above, an alternator controller comprises: a starting-completion detecting circuit for generating a signal indicating completion of engine starting from a voltage generated by an alternator; a target charging voltage switching circuit for switching a target charging voltage for a battery according to an engine condition signal from an engine control unit; a generation prohibiting circuit for generating a prohibit-power-generation signal when the voltage of the battery is larger than the target charging voltage; a gradual excitation control circuit for generating a gradual excitation control signal according to the engine condition signal from the engine control unit, wherein if an engine starting condition is right when the engine starts, the gradual excitation control circuit gradually initiates generation by the alternator just after the engine starts and when the engine starting condition is wrong, the circuit delays generation by the alternator after the engine starts and then initiates the alternator to generate gradually; and an alternator control circuit for generating an alternator control signal from the starting-completion signal, the prohibit-power-generation signal, and the gradual excitation control signal, wherein the alternator control signal initiates the generation by the alternator according to, the gradual excitation control signal when the engine starts and makes the alternator generate according to the prohibit-power-generation signal after the completion of the starting. With these features, in the alternator in which power generation therefrom is controlled by switching the target charging voltage by the signal from the engine control unit, engine-starting characteristics when the engine starts can be prevented from deterioration due to the load of the alternator. Furthermore, when the engine starting condition is wrong, the engine-starting characteristic can be improved by delaying generation starting for a predetermined time. The above-mentioned object can be achieved without increasing the number of signal lines from the engine control unit by using the signal from the engine control unit as the signal representing the engine-starting characteristic when the engine starts and using the signal as the signal for switching the target voltage after the engine-starting.

The starting-completion detecting circuit may comprise a comparator for detecting the completion of engine starting by comparing the voltage generated by the alternator with a predetermined reference voltage. Therefore, the signal for confirming the starting-completion can be obtained with a simple structure.

The gradual excitation control circuit may comprise a comparator for generating the gradual excitation control signal in which the duty ratio increases gradually based on a comparison between a sawtooth wave and a linear wave increasing with time from the minimum voltage of the sawtooth wave when the engine starting condition is right, and between a sawtooth wave and a linear wave increasing with time from a voltage lower than the minimum voltage of the sawtooth wave when engine starting condition is wrong. With these features, the circuit for generating the gradual excitation control signal can be achieved with a simple structure.

The alternator control circuit may comprise a switching element connected in series to a field winding of the alternator and a logic circuit for generating a signal by using the starting-completion signal, the prohibit-power-generation signal, and the gradual excitation control signal as inputs, the signal controlling the switching element so as to initiate generation b the alternator according to the predetermined gradual excitation control signal when the engine starts and to make the alternator generate according to the prohibit-power-generation signal after the completion of the starting. With these features, the circuit can be achieved with a simple structure for generating the alternator control signal so as to initiate generation by the alternator according to the predetermined gradual excitation control signal when the engine starts and to make the alternator generate according to the prohibit-power-generation signal after the completion of the starting.

What is claimed is:

1. An alternator controller comprising:
    a starting-completion detecting circuit for generating a signal indicating completion of engine starting from a voltage generated by an alternator;
    a target charging voltage switching circuit for switching a target charging voltage for a battery according to an engine condition signal from an engine control unit;
    a generation prohibiting circuit for generating a prohibit-power-generation signal when the voltage of the battery is larger than the target charging voltage;
    a gradual excitation control circuit for generating a gradual excitation control signal according to the engine condition signal from the engine control unit, wherein if an engine starting condition is normal when the engine starts, the gradual excitation control circuit gradually initiates generation by the alternator just after the engine starts and when the engine starting condition is abnormal, the circuit delays generation by the alternator after the engine starts and subsequently initiates the alternator to generate gradually; and
    an alternator control circuit for generating an alternator control signal from the starting-completion signal, the prohibit-power-generation signal, and the gradual excitation control signal, wherein the alternator control signal initiates generation by the alternator according to the gradual excitation control signal when the engine starts and controls alternator generation according to the prohibit-power-generation signal after the completion of starting.

2. An alternator controller according to claim 1, wherein the starting-completion detecting circuit comprises a comparator for detecting the completion of engine starting by comparing the voltage generated by the alternator with a predetermined reference voltage.

3. An alternator controller according to claim 1, wherein the gradual excitation control circuit comprises a comparator for generating the gradual excitation control signal in which the duty ratio increases gradually based on a comparison between a sawtooth wave and a linear wave increasing with time from the minimum voltage of the sawtooth wave when the engine starting condition is normal, and between a sawtooth wave and a linear wave increasing with time from a voltage lower than the minimum voltage of the sawtooth wave when engine starting condition is abnormal.

4. An alternator controller according to claim 1, wherein the alternator control circuit comprises a switching element connected in series to a field winding of the alternator and a logic circuit for generating a signal by using the starting-completion signal, the prohibit-power-generation signal, and the gradual excitation control signal as inputs, the signal controlling the switching element so as to initiate generation by the alternator according to the predetermined gradual excitation control signal when the engine starts and to control alternator generation according to the prohibit-power-generation signal after the completion of starting.

* * * * *